PNEUMATIC MOVEMENT OF DATA MEMBER

Filed July 21, 1965

INVENTOR.
JOSEPH E. SMITH, JR.
BY
Bower & Patalidis
ATTORNEYS

INVENTOR.
JOSEPH E. SMITH, JR.
BY
*Bower & Patalidis*
ATTORNEYS

United States Patent Office 3,422,411 Patented Jan. 14, 1969

3,422,411

PNEUMATIC MOVEMENT OF DATA MEMBER

Joseph E. Smith, Jr., Birmingham, Mich., assignor to Ex-Cell-O Corporation, Detroit, Mich.

Filed July 21, 1965, Ser. No. 473,600
U.S. Cl. 340—174.1 18 Claims
Int. Cl. G11b 5/00

ABSTRACT OF THE DISCLOSURE

An interchangeable data storage cartridge for use with a data processing system which has an enclosed transfer chamber which houses a data storage card and is provided with an air pressure and an air vacuum system which can be automatically alternated between the ends of the elongated chamber to reciprocate the data storage card back and forth in the chamber and placing it in functional contact with a data processing head.

This invention relates generally to a data storage or memory apparatus for data processing systems, and more particularly to a data storage system and a method for controlling a moving data storage member for operative engagement with the processing head means of a data processing station for either reproducing data indicia from the surface of said data storage member or for recording data indicia thereon.

Heretofore, many devices have been provided to supply high speed computers with data storage devices such as magnetic drums and discs, magnetic perforated cards, and magnetic and perforated tapes. These data storage devices are complicated, expensive, and unreliable in many instances. For example, magnetic tape transport devices employ take-up rollers which exert tension on the tape and cause stretching, twisting and other force distortions that create data skew.

Accordingly, it is an important object of the present invention to provide a novel and improved dynamic data storage system which overcomes the aforementioned disadvantages of the prior art devices.

It is another object of the present invention to provide a novel and improved data storage device using a reciprocating storage member unit which can carry out the same functions as accomplished by the prior art devices, but in a simpler, less expensive, and more reliable manner, and with the added advantages of being removable and replaceable with a similar unit, and interchangeable from one data processing system to another.

It is a further object of the present invention to provide a novel and improved data storage cell which is compact in construction, and is capable of storing a large amount of data indicia in a minimum storage area, surface or volume.

It is still another object of the present invention to provide a novel and improved data storage system including a data storage cell in the form of a removable housing containing a sheet that may comprise a strip, card or chip on which data may be stored magnetically, or by printing, marking, photographing, perforating, thermographing, electrographing, or by other optical techniques, and wherein the sheet is reciprocated in contact with or in close proximity to a data processing station, such as a multi-channel magnetic head, for recording data on the surface of the sheet, or reading back data previously recorded for use with a data processing system such as a computer.

It is another object of the present invention to provide a data storage apparatus which includes an enclosed chamber, data indicia bearing means movably disposed in said chamber, at least one data processing station disposed adjacent said chamber and in communication therewith, and means for creating alternate pressure differentials in the opposite ends of said chamber for propelling said data indicia bearing means through a reciprocating path in said chamber and into operative engagement with said data processing station.

It is a further object of the present invention to provide a method for controlling the movement of a data indicia bearing means relative to a data processing station which includes mounting the data indicia bearing means in an elongated, enclosed chamber which communicates with said data processing station, creating a pneumatic pressure in one end of the chamber and a vacuum in the other end of the chamber to propel the data indicia bearing means to one end of the chamber and into operative engagement with the data processing station, and reversing the pressure and vacuum in said chamber to propel the data indicia bearing means to the other end of the chamber and into operative engagement with said data processing station.

It is still another object of the present invention to provide a data storage apparatus which includes a housing, a pair of spaced apart guide members on said housing, a data cell detachably mounted on said guide members, said data cell including an elongated chamber and a data indicia bearing means movably disposed in said chamber, at least one data processing station disposed adjacent said elongated chamber and in communication therewith, and means for creating alternate pressure differentials in the opposite ends of said chamber for propelling said data indicia bearing means through a reciprocating path in said elongated chamber and into operative engagement with said data processing station including a source of high pressure fluid, a source of low pressure fluid, conduit means in said guide members connected to said sources of fluid, and conduit means in said elongated chamber adapted to be automatically connected to said conduit means in said guide members when the cell is mounted in said guide members to connect said elongated chamber to said sources of high and low pressure fluids.

Other objects, features and advantages of this invention will be apparent from the following detailed description, appended claims, and the accompanying drawings.

Figure 1:
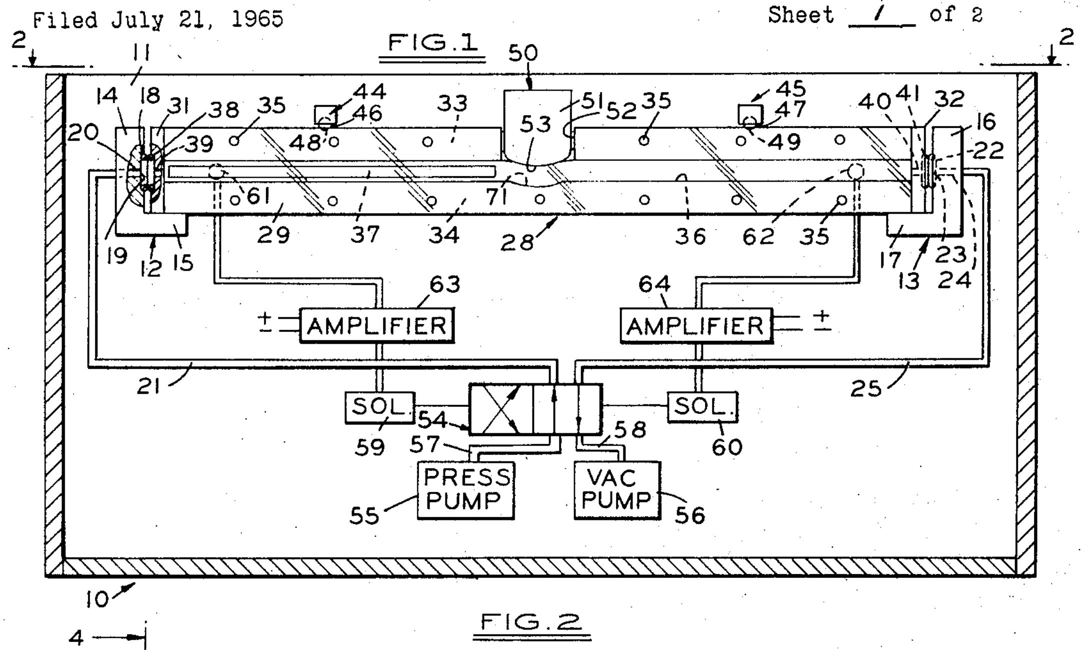
FIG. 1 is a simplified schematic front elevational view of an illustrative data storage apparatus made in accordance with the principles of the present invention.

Referring now to the drawings and in particular to FIGS. 1 through 4, the numeral 10 generally indicates a housing on which is mounted an illustrative embodiment of the invention. The housing 10 is provided with a vertical rear wall 11 on the front side of which is mounted a pair of laterally spaced apart, outwardly extending combination guide and support blocks 12 and 13. The blocks 12 and 13 are secured to the housing rear wall 11 by any suitable means, as by welding. The blocks 12 and 13 are substantially L shaped and comprise the vertical legs 14 and 16 and the integral inwardly extended horizontal legs 15 and 17, respectively.

Figure 3:
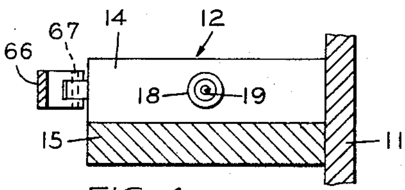
FIG. 3 is a fragmentary, elevational, section view of the structure illustrated in FIG. 2, taken along the line 3—3 thereof, and looking in the direction of the arrows.

As shown in FIGS. 1 and 3, a suitable sealing means 18, such as an O-ring, is operatively mounted in a recess on the inner side of the block vertical leg 14 in a position to surround a fluid port 19. As shown in FIG. 1, the port 19 communicates with a passage 20 formed through the block leg 14. A suitable conduit 21, such as a hose or tubing, has one end thereof operatively connected to the outer end of the passage 20 for admitting and exhausting fluid under pressure, such as pressurized air, into the passage 20, as more fully explained hereinafter. As shown in FIG. 1, the block 13 is also provided with a similar seal 22, port 23, passage 24 and conduit 25. The conduits 21 and 25 are arranged to be controllably connected to sources of high and low pressure fluids, as more fully explained hereinafter, preferably to sources of pressurized air and of vacuum.

Figure 2:
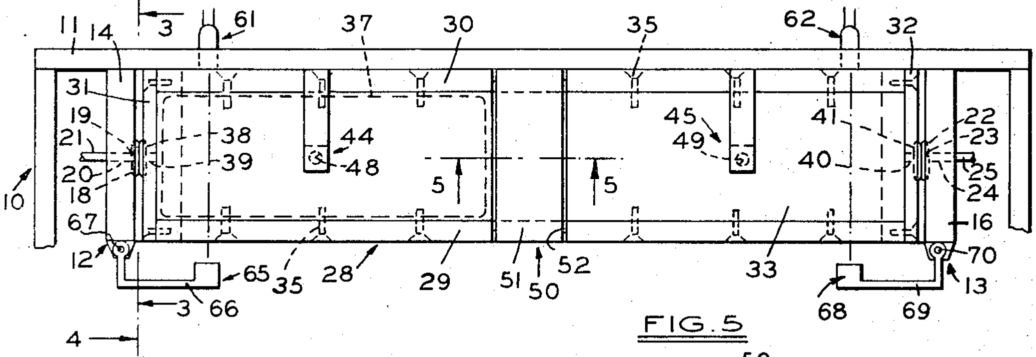
FIG. 2 is a horizontal view of the structure illustrated in FIG. 1, taken along the line 2—2 thereof, and looking in the direction of the arrows.

As shown in FIGS. 1 and 2, the data storage system of the present invention includes a data storage cell or tube cartridge 28 which is substantially rectangular in overall configuration. As best seen in FIG. 2, the tube cartridge 28 includes the spaced apart front and rear vertical side walls 29 and 30, respectively, and the vertical end walls 31 and 32. The side walls 29 and 30 are preferably made from a suitable transparent material, such as glass or transparent plastic. The tube cartridge 28 further includes the top and bottom walls 33 and 34 which may be made from any suitable material, as for example, a suitable metal. The aforementioned tube cartridge walls are secured together by any suitable means, as by the screws 35. As shown in FIG. 1, the top and bottom walls 33 and 34 are spaced apart so as to provide the rectangular elongated chamber 36 in which is slidably mounted a movable data indicia bearing member 37 such as an elongated card, tape or chip.

Figure 4:
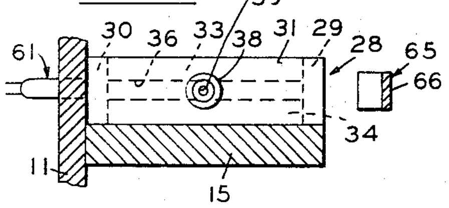
FIG. 4 is a fragmentary, elevational section view of the structure illustrated in FIG. 2, taken along the line 4—4 thereof, and looking in the direction of the arrows.

As best seen in FIG. 4, the tube cartridge end wall 31 is provided with a port 39 which extends therethrough and communicates on the inner end thereof with the chamber 36 and on the outer end thereof with the port 19 in the block leg 14. A suitable O-ring sealing means 38 is mounted in a recess on the outer face of the cartridge end wall 31 and sealingly engages the sealing means 18 on the block leg 14 when the tube cartridge 28 is mounted in the position shown in FIGS. 1 and 2. As shown in FIGS. 1 and 2, the other end wall 32 of the tube cartridge 28 is provided with a similar port 40 and sealing means 41 for communicating the other end of the chamber 36 with the conduit 25.

It will be seen that the tube cartridge 28 may be quickly and easily inserted into the operative position between the blocks 12 and 13, eiher manually or by a suitable automatic loading and unloading means. The tube cartridge 28 may be releasably secured in position on the blocks 12 and 13 by any suitable means, as for example, by the spaced apart detent means generally indicated by the numerals 44 and 45. The detent means 44 and 45 are fixedly secured to the wall 11 by any suitable means, and are provided with the usual spring biased detent balls 46 and 47 which extend downwardly and into operative engagement with the depressions 48 and 49, respectively, formed in the upper wall 33 of the tube cartridge 28.

As shown in FIGS. 1 and 2, the data storage system of the present invention is provided with a data processing station, generally indicated by the numeral 50, provided with a data processing head 51 which may be an electromagnetic, electrostatic, or optical transducer, for example, and which is fixedly secured in position on the wall 11 by any suitable means. The data processing head 51 extends outwardly into operative sealing engagement in the slot 52 which is formed through the upper wall 33 of the tube cartridge 28. The data processing station slot 52 extends transversely of the tube cartridge 28 and communicates with the chamber 36. As shown in FIG. 1, the lower operative end portion 53 of the data processing head 51 is disposed within the slot 52 and is extended into the upper side of the chamber 36 a slight distance so as to operatively engage the upper surface of the data indicia bearing member 37 when it is reciprocated in the chamber 36, as more fully explained hereinafter.

It will be understood that the data indicia bearing member 37 may comprise a sheet, a tape strip, an elongated card or a chip, and the data may be stored and retrieved from the surface of the data indicia bearing member 37 by any suitable process. For purposes of explanation of the invention it will be assumed that the data indicia bearing member 37 is a magnetic tape strip and that the data processing head 51 is a magnetic transducer head which may either be used for recording or retrieving the data from the magnetic tape strip 37. The data processing magnetic head 51 can record data on the magnetic surface of the magnetic tape strip 37 or read back data previously recorded for use with a data processing system such as a computer. The tube cartridges 28 are removable and replaceable in a matter of seconds, and they are interchangeable from one data processing system to another. It will be understood that commercially available standard magnetic tape sizes, that is widths and thicknesses, of the magnetic tape strip 37 may be used in the tube cartridge 28. The magnetic tape strip 37 may be made of any suitable material, including thin metal strips. The tube cartridge 28 and the coacting structure of the data storage system of the present invention may be readily adapted to different strip widths, lengths and thicknesses for various applications.

As shown in FIG. 1, the fluid conduits 21 and 25 are operatively connected to a suitable four-way, solenoid operated flow control valve, generally indicated by the numeral 54. The valve 54 is connected to suitable sources of pressurized air and vacuum, as for example, the pressure pump 55 and the vacuum pump 56, by conduits 57 and 58, respectively. The flow control valve 54 alternately directs pressurized air and vacuum to the opposite ends of the tube cartridge chamber 36 to create differentials in pressure which propel the magnetic tape strip 37 from one end of the chamber 36 to the other and back, in a fast and efficient manner.

The valve 54 is operated by a pair of solenoids 59 and 60 which may be energized by any suitable control means, as for example, a photoelectric sensor means. As shown in FIGS. 1 and 2, a pair of conventional photoelectric cells, generally indicated by the numerals 61 and 62, is operatively mounted in the housing wall 11 in spaced apart positions so as to align with a pair of light sources 65 and 68 directed through the transparent side walls 29 and 30. As illustrated in FIG. 1, the photoelectric cells 61 and 62 are operatively connected to suitable amplifier means 63 and 64 which are in turn operatively connected to a suitable source of electrical power and the valve solenoids 59 and 60, respectively. As shown in FIG. 2, the light source 65 may be mounted on an arm 66 which is hinged at 67 on the block 12 to permit it to be swung away during loading of the tube cartridge 28. The other light source 68 may be similarly mounted on the block 13 by the arm 69 and hinge 70.

Figure 5:
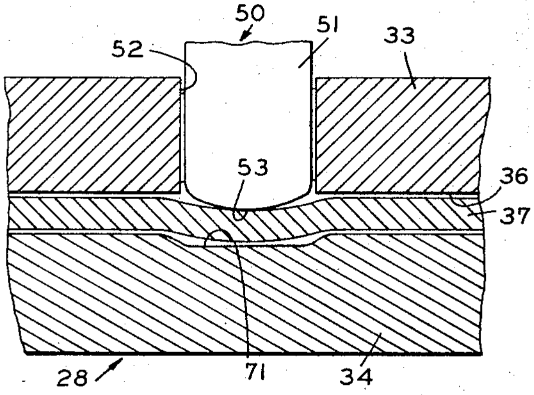
FIG. 5 is a fragmentary, enlarged, elevational section view of the structure illustrated in FIG. 2, taken along the line 5—5 thereof, and looking in the direction of the arrows.

In use, a tube cartridge 28 is manually or automatically inserted into position between the blocks 12 and 13 and with the data processing head 51 disposed in the slot 52 in the position shown in FIGS. 1 and 5. Assuming that the magnetic tape strip 37 is in the position shown in FIG. 1, the tape strip breaks the ray of light between the light source 65 and the photoelectric cell 61. The solenoid 59 is then energized to move the valve 54 to the position shown in FIG. 1, whereby pressurized air is forced into the left end of the tube cartridge chamber 36 and a vacuum is created in the right end of the tube chamber 36. The pressure differential thus created in the chamber 36 causts the magnetic tape strip 37 to be propelled to the right end of the chamber 36, as viewed in FIG. 1. When the tape strip 37 approaches the right end of the chamber 36 it interrupts the ray of light between the light source 68 and the photoelectric cell 62, whereby the solenoid 60 is energized and the valve 54 is reversed so as to direct pressurized air into the right end of the chamber 36 and create a vacuum in the left end of the chamber 36. The reversed pressure differential then causes the tape strip 37 to be propelled to the left end of the chamber 36, back to the solid line position shown in FIG. 1. As the moving tape strip 37 approaches each end of the chamber 36, the tape is decelerated, stopped and then accelerated in the opposite direction. The process of propelling the tape strip 37 from one end to the other and back in the chamber 36 continues so long as the pressure reversing system is energized.

FIG. 5 illustrates the disposition of the data processing head inner end portion 53 for insuring contact of the tape strip 37 with the data processing head 51 or transducer. It will be understood that the inner surfaces of the top and bottom walls 33 and 34 of the tube cartridge 28 are precision ground so as to form a precision guide means for the reciprocating tape strip 37. By extending the lower curved end 53 of the data processing head 51 so as to protrude slightly into the chamber 36, and forming a complementary concave curved recess 71 on the lower wall 34, the tape strip 37 is slightly deflected from the straight trajectory of the guide chamber 36, and the force of deflection or bending of the tape strip 37 can be regulated so it is caused to run in contact with the end portion 53 of the data processing head 51. By providing a deflection of a lesser amount, the tape strip 37 could be caused to pass the portion 53 of the data processing head 51 with an interposed hydrodynamic air film.

Figures 6, 7, 8, 9, 10:
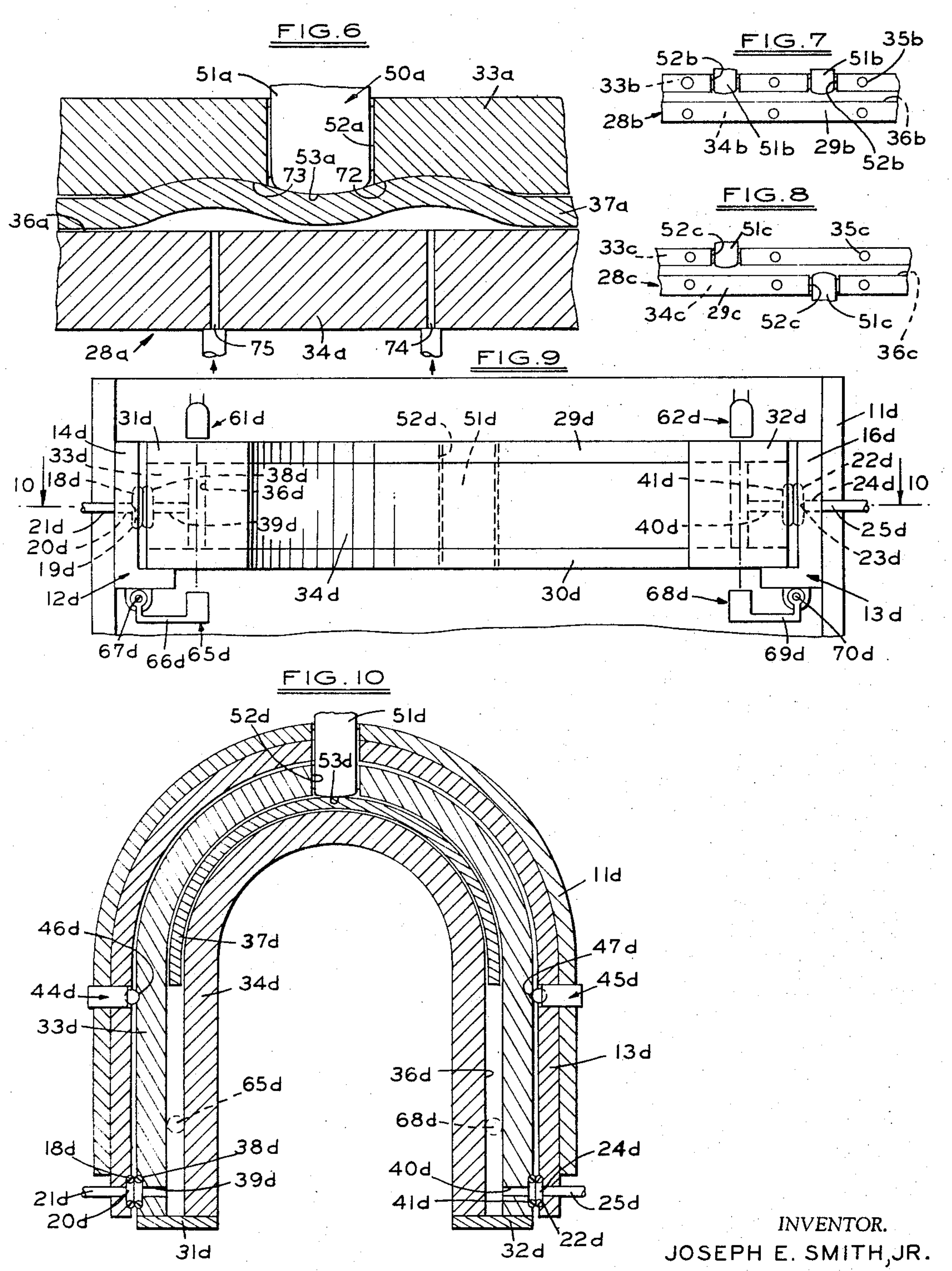
FIG. 6 is a fragmentary, elevational section view, similar to that of FIG. 5, but showing a modification.
FIG. 7 is a fragmentary, elevational section view, similar to that of FIG. 5, but showing another modification.
FIG. 8 is a fragmentary, elevational section view, similar to that of FIG. 5, but showing a further modification.
FIG. 9 is a fragmentary, front elevational view of a second embodiment of the invention; and, FIG. 10 is a top plan view of the structure illustrated in FIG. 9, taken along the line 10—10 thereof, and looking in the direction of the arrows.

FIG. 6 illustrates a modification of the structure shown in FIG. 5, showing another arrangement for maintaining contact or close proximity of the moving magnetic tape strip **37*a* which the data processing head 51*a***. The parts of the embodiment of FIG. 6 which are the same as the embodiment of FIG. 5 are marked with the same reference numerals followed by the small letter *a*. In the structure shown in FIG. 6, the data processing head **51*a* which is disposed in the slot 52*a* does not protrude into chamber 36*a* so as to bring the end portion 53*a* substantially flush with the inner surface of the upper wall 33*a*. Concave transverse recesses 72 and 73 are formed on each side of the slot 52*a*. A pair of passages 74 and 75 is disposed through the lower wall 34*a* in a position opposite the recesses 72 and 73, respectively. The passages 74 and 75 are normally connected to a suitable source of pressurized fluid as air. It will be seen that as the tape strip 37*a* is moved past the data processing head 51*a*, the tape strip is forced upwardly into the recesses 72 and 73 and into operative engagement with the lower end portion 53*a* of the data processing head 51*a* of the data processing station 50*a***.

FIG. 7 shows another modification wherein a pair of data processing heads **51*b* is employed. FIG. 7 is a fragmentary, side elevational view of a tube cartridge 28*b*, and the parts which are similar to the tube cartridge 28** of the first embodiment have been marked with the same reference numerals followed by the small letter *b*. If desired, one of the data processing heads **51*b* may be a reading head and the other head 51*b*** may be a recording head.

FIG. 8 illustrates a further modification of the tube cartridge 28 of the first embodiment. The parts of the embodiment of FIG. 8 which are the same as the parts of the first embodiment are marked with the same reference numerals followed by the small letter *c*. The modified structure of FIG. 8 shows the use of a first data processing head **51*c* on the upper side of the tube cartridge 28*c*, and a second data processing head 51*c* on the bottom side of the tube cartridge 28*c*. The structure of FIG. 8 permits the use of both surfaces of the data indicia bearing sheet or tape trap 37*c*. The tape strip 37*c*** may be used on both sides by utilizing a thicker strip or a strip with magnetic shielding between the upper and lower surfaces.

FIGS. 9 and 10 illustrate another embodiment of the invention wherein the tube cartridge **28*d* is U-shaped so as to utilize the centrifugal force on the tape strip 37*d* moving in the chamber 36*d* to provide efficient contact between the tape strip and the end portion 53*d* of the data processing head 51*d***, or extremely close spacing therebetween. The parts of the embodiment of FIGS. 9 and 10 which are the same as the embodiment of FIGS. 1 and 2 have been marked with the same reference numerals followed by the small letter *d*. The embodiment of FIGS. 9 and 10 operates in the same manner as the embodiment of FIGS. 1 and 2. The only difference is in the physical construction wherein the ends of the tube cartridge have been bent downwardly to form the U-shape, and the cartridge is then inserted into the supporting blocks on its side.

The embodiment of FIGS. 9 and 10 makes use of the same pressure differential control apparatus as described hereinbefore for the embodiment of FIGS. 1 and 2. It will be understood that the embodiment of FIGS. 9 and 10 may also be provided with the modifications of FIGS. 6, 7 and 8, if desired. The embodiment of FIGS. 9 and 10 offers an advantage over the arrangement of FIGS. 1 and 2 in that it is more compact from a space standpoint. A spiral configuration for the tube cartridge 28 may also be used for extremely long tape strips 37.

It will be understood that the data storage system of the present invention uses conventional circuit and logic designs and techniques normally used with other types of data storage apparatus, such as magnetic drums, disc files, magnetic and optical cards, continuous tapes, and the like. The data indicia bearing strip 37 may be caused to move back and forth under the data processing head 51 of the data processing station 50 continuously or only when started by the computer, and for as long as is required for data recording or data retrieving purposes. The data storage system of the present invention provides access time to data which is considerably faster than other card and tape data storage devices. It is thermally insensitive, self-cleaning, and self-purging. It has faster start and stop times than any of the conventional magnetic drums, disc files and magnetic or optical card and tape storage devices and it operates only when required. When reciprocating back and forth in the guide chamber 36, the data indicia bearing strips 37 are pneumatically buffered at each end of their stroke travel, and thus never experience mechanical contact or abuse when decelerating, stopping and reversing direction. Furthermore, the tape strips move back and forth on an air or fluid film except for the arrangements in which the strips operate in contact with the end portion of the processing heads. Accordingly, the rubbing forces are less than those required for tape transports in that the end portion of the processing heads does not experience forces required to overcome the inertia and mass of the take-up loops when reversing direction. Data processing station head wear is also minimized in that the system automatically purges itself of contamination on the exhaust or vacuum end of each stroke. Inasmuch as the data indicia bearing strips are not subject to distortions, strain, stretch and permanent set, the recording techniques are not limited. Timing tracks can be used to establish the register of the data. It will be obvious that the data processing stations 50 are provided with suitable sealing means so as to provide an airtight sealing engagement with the slots 52.

While it will be apparent that the preferred embodiments of the invention herein disclosed are well calculated to fulfill the objects above stated, it will be appreciated that the invention is susceptible of modification, variation and change without departing from the proper scope or fair meaning of the subjoined claims.

What is claimed is:

1. In a data storage apparatus, the combination comprising:
- (a) a housing;
- (b) a pair of spaced apart guide members on said housing;
- (c) a data storage cell;
- (d) a detachable mounting means mounting said data storage cell on said spaced apart guide members;
- (e) said data storage cell including,
  - (1) two side wall members,
  - (2) a top wall member,
  - (3) a bottom wall member,
  - (4) two end wall members,
  - (5) an elongated chamber formed by said wall members, and
  - (6) a data indicia bearing member movably disposed in said elongated chamber;
- (f) at least one data processing station disposed adjacent said data storage cell and extends into said elongated chamber;
- (g) said data processing station makes sealing contact with said data storage cell when extending into said elongated chamber;
- (h) first of said end wall members forming the first end of said data storage cell, and second of said end wall members forming the second end of said data storage cell;
- (i) said first and second end wall members having inlet means;
- (j) fluid pressure connecting means contacting said inlet means for creating alternate fluid pressure differentials in the opposite ends of said elongated chamber for propelling said data indicia bearing member through a reciprocating path in said elongated chamber and into operative engagement with said data processing station; and
- (k) control means to automatically create the alternate fluid pressure differentials in the opposite ends of said elongated chamber.

2. The data storage apparatus as defined in claim 1, wherein:
- (a) said enclosed chamber is a U-shaped chamber; and,
- (b) said data processing station is disposed in communication with the bight portion of said U-shaped chamber.

3. The data storage apparatus as defined in claim 1, including:
- (a) means for creating a fluid pressure on one surface of the data indicia bearing means for pressing the opposite surface into operative contact with said data processing station.

4. The data storage apparatus as defined in claim 1, wherein:
- (a) said data indicia bearing means comprises a sheet of optically stored data; and,
- (b) said data processing station comprises an optical reading head.

5. The data storage apparatus as defined in claim 1, wherein:
- (a) said means for creating alternate fluid pressure differentials includes,
  - (1) a source of pressurized fluid,
  - (2) a vacuum source,
  - (3) conduit means in said guide members connected to said sources of pressurized fluid and vacuum, and,

- (4) conduit means in said data storage cell adapted to be automatically connected to said conduit means in said guide members when the cell is mounted in said guide members to connect said chamber to said sources of pressurized fluid and vacuum.

6. The data storage apparatus as defined in claim 5, including:
- (a) means for reversing the flow of pressurized fluid and vacuum into said conduit means in said guide members.

7. The data storage apparatus as defined in claim 1, wherein:
- (a) first and second recesses are provided in said guide members adjacent said data storage cell;
- (b) first and second O-ring sealing members are provided in said first and second recesses, respectively;
- (c) third and fourth recesses are provided in said end wall members forming part of said inlet means of said data storage cell adjacent said first and second recesses, respectively;
- (d) third and fourth O-ring sealing members are provided in said third and fourth recesses, respectively; and
- (e) said first and second O-ring sealing members make sealing contact with said third and fourth O-ring sealing members when said data storage cell is mounted on said guide members.

8. The data storage apparatus as defined in claim 7, wherein:
- (a) a concave recess is provided in said bottom wall member; and
- (b) said concave recess is substantially aligned with said data processing station.

9. The data storage apparatus as defined in claim 8, wherein:
- (a) said side wall members are made of transparent material;
- (b) first and second photoelectric cells are mounted on said housing adjacent one of said side walls and substantially aligned with said elongated chamber;
- (c) said first photoelectric cell is positioned near said first end of said data storage cell and said second photoelectric cell is positioned near said second end of said data storage cell;
- (d) first and second light sources are swingably mounted on said guide members;
- (e) said first and second light sources are substantially aligned with said first and second photoelectric cells, respectively, when said data storage cell is mounted on said guide members; and
- (f) said first and second light sources are swung out of alignment with said data storage cell when it is to be removed from said data storage apparatus.

10. The data storage apparatus as defined in claim 1, wherein:
- (a) said means for creating said fluid pressure differentials includes,
  - (1) a source of pressurized fluid,
  - (2) a vacuum source, and,
  - (3) means for connecting the sources of pressurized fluid and vacuum alternately to each end of said chamber.

11. The data storage apparatus as defined in claim 10, wherein:
- (a) said means for connecting the sources of pressurized fluid and vacuum alternately to each end of said chamber includes,
  - (1) a reversing valve means interconnected between said sources of pressurized fluid and vacuum and said chamber, and,
  - (2) means for actuating said reversing valve means when the data indicia bearing means approaches the ends of the chamber.

12. The data storage apparatus as defined in claim 11, wherein:

(a) said means for actuating said reversing valve means includes a photoelectric means.

13. The data storage apparatus as defined in claim 1, wherein:

(a) said data storage apparatus includes a plurality of data processing stations in communication with said chamber.

14. The data storage apparatus as defined in claim 13, wherein:

(a) said plurality of data processing stations are disposed for operative engagement with one surface of said data indicia bearing means.

15. The data storage apparatus as defined in claim 13, wherein:

(a) some of said plurality of data processing stations are disposed for operative engagement with one surface of said data indicia bearing means; and, (b) the remainder of said plurality of data processing stations are disposed for operative engagement with another surface of said data indicia bearing means.

16. The data storage apparatus as defined in claim 1, wherein:

(a) said data indicia bearing means comprises a magnetic surface member; and, (b) said data processing station comprises a magnetic data processing transducer head.

17. The data storage apparatus as defined in claim 16, wherein:

(a) said magnetic data processing transducer head comprises a magnetic reading head.

18. The data storage apparatus as defined in claim 16, wherein:

(a) said magnetic data processing transducer head comprises a magnetic recording head.

References Cited

UNITED STATES PATENTS

| | | | |
|---|---|---|---|
| 2,981,411 | 4/1961 | Azari | 226—97 |
| 2,984,398 | 5/1961 | Chalmers | 226—97 |
| 3,314,729 | 4/1967 | Baumeister et al. | 226—97 |
| 3,184,131 | 5/1965 | Fieldgate | 226—97 |
| 3,291,410 | 12/1966 | Berryman | 226—97 |
| 3,327,916 | 6/1967 | Weidenhammer et al. | 226—97 |
| 3,342,430 | 9/1967 | Murphy | 226—97 |

TERRELL W. FEARS, *Primary Examiner.*

V. P. CANNEY, *Assistant Examiner.*

U.S. Cl. X.R.

271—3, 74; 226—97